Aug. 20, 1935.　　　A. A. MARKS　　　2,011,978
MOVABLE CARRIAGE FOR HAY LOADERS
Filed Oct. 20, 1933　　　2 Sheets-Sheet 2
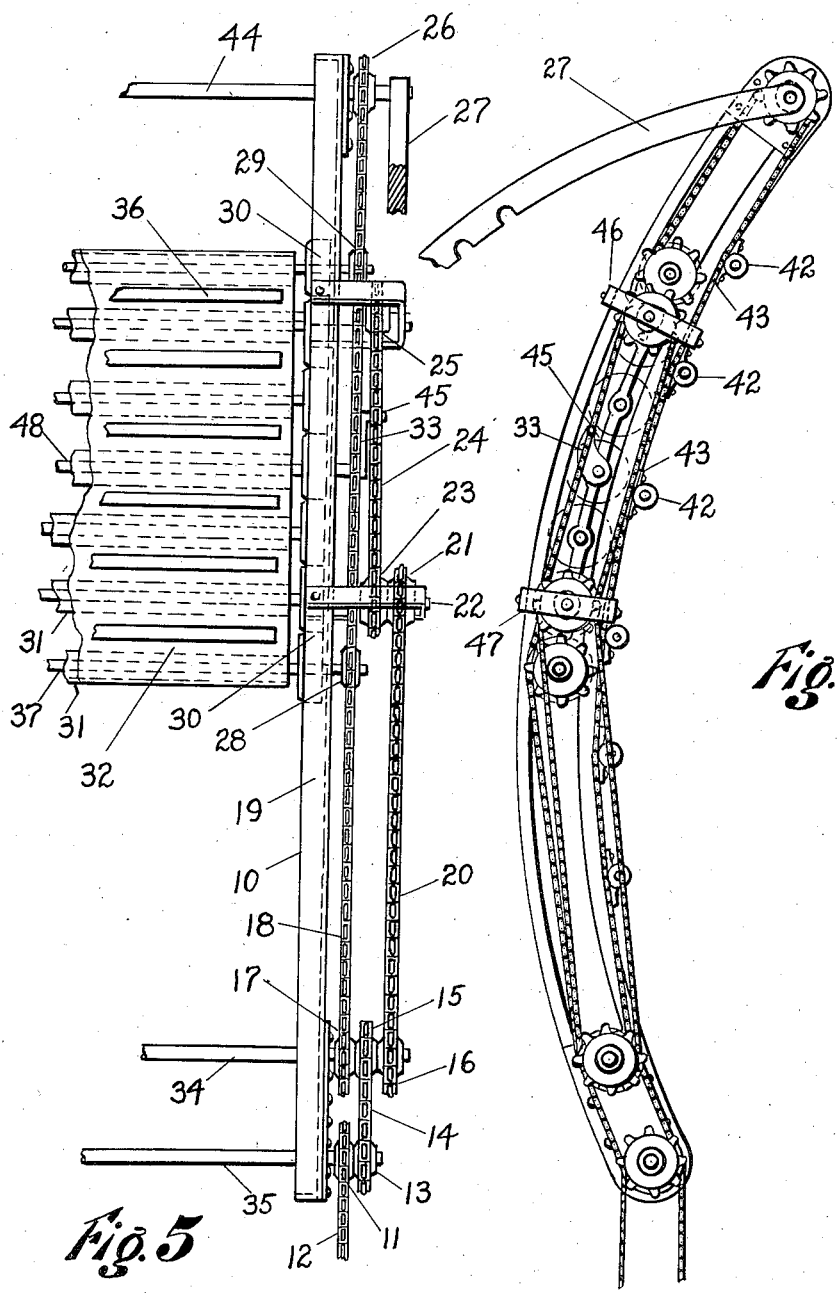
INVENTOR
Albert A. Marks
BY
John F. Bauer
ATTORNEY Patented Aug. 20, 1935

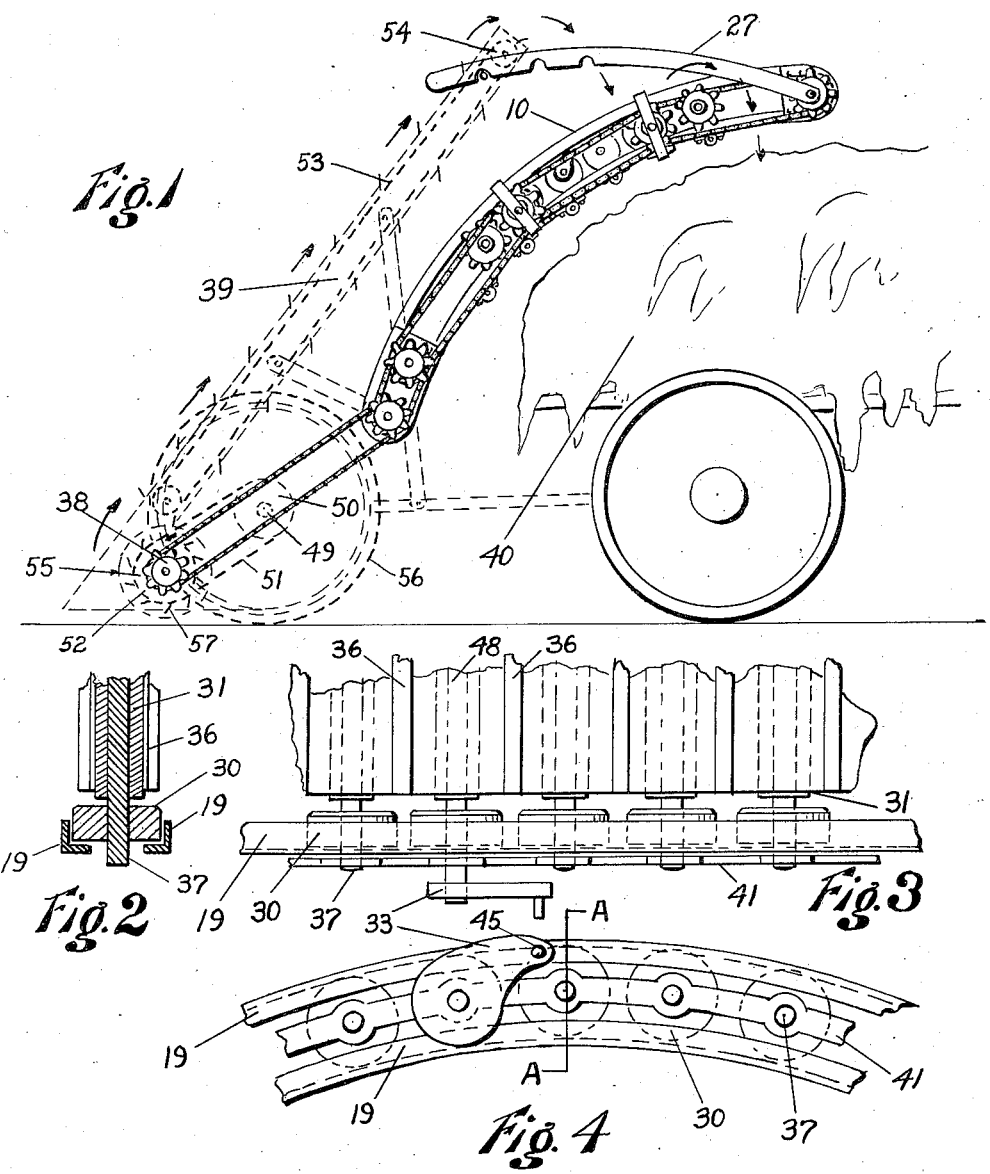

2,011,978

UNITED STATES PATENT OFFICE 2,011,978

MOVABLE CARRIAGE FOR HAY LOADERS

Albert A. Marks, West Allis, Wis.

Application October 20, 1933, Serial No. 694,495

2 Claims. (Cl. 198—112)

The object of the invention is to provide a carrier for hay loaders, that will deposit the hay onto the vehicle, and spread it over the entire load, from the front to the back.

Another object of the invention is to provide a mechanical method of distributing the hay on the load and thereby eliminate the manual work connected with the loading of hay.

Another object of the invention is to provide a movable extension of simple inexpensive construction, that can be attached to any hay loader without any great mechanical changes, and that will distribute the hay over the load as it is loaded.

The invention is illustrated in the accompanying drawings, and will be hereinafter fully set forth.

In the accompanying drawings

Fig. 1 shows the movable hay loading carriage attached to any conventional type of hay loader.

Fig. 2 shows a cross sectional view of the roller arrangement in the frame at line A—A of Fig. 4.

Fig. 3 shows a fragmentary plan view of one side of the carriage.

Fig. 4 shows a fragmentary side view of one side of the carriage.

Fig. 5 a fragmentary plan view of the one side of the entire attachment showing the frame with the movable carriage.

Fig. 6 a side view of the entire attachment showing the chain arrangement.

Referring more particularly to the drawings, the numeral 10, refers to the extension as a unit. There is a sprocket 11, on shaft 35, that is turned by the drive sprocket 38, on the hay loader 39. The drive sprocket 13, on the shaft 35, turns the shaft 34, by means of a chain 14, over the sprocket 15. The sprocket 17, on shaft 34, actuates the chain 18, which rests on sprockets 28 and 29 and the driven sprocket 26, on the shaft 44, and returns over the rollers 42, held on the guide rails 19, by bearings 43. There is a sprocket 16, on shaft 34, driving a chain 20, over sprocket 21, on shaft 22. This shaft 22, turns sprocket 23, with a chain 24, turning sprocket 25.

A movable carriage 32, consisting of a series of shafts 37, with rollers 31, covered by a cleated canvas belt. These shafts 37, have larger rollers 30, rolling in guides 19. The shaft 48, of the carriage 32, has a link 33, fastened to it. This link 33 is fastened to the chain 24, at the point 45. The rollers 30, rolling in the guides 19, are fastened together by the integral link 41. The sprocket 25 is supported by a bearing in a bracket 46, while the sprockets 21 and 23, on shaft 22, are supported by a bearing on bracket 47. There is an adjustable arm 27, at the top of the extension, for support on the top of hay loader 39, and the hay on the load is indicated in Fig. 1, by the numeral 40.

In operation the hay takes the course indicated by the arrows in Fig. 1. The hay loader 39 is drawn behind a wagon on which the hay is to be deposited. As the wheels 56, on the hay loader 39, roll on the ground, the shaft 49 is turned, rotating sprocket 50. There is a chain 51, over sprocket 50, which turns sprocket 52, rotating the pick-up roller 55, and sprocket 38. The prongs 57, on the roller 55, carry the hay to the conveyer 53, which in turn is actuated by a sprocket and chain from roller 55, and carries the hay up to sprocket 54, from which point it is thrown over the end of the hay loader 39, onto the movable carriage 32, supported by the extension 10.

The sprocket 38, on the hay loader 39, actuates belt 12, which turns sprocket 11, on shaft 35, driving sprocket 13, to actuate shaft 34, by means of chain 14, over sprocket 15. Shaft 34, turning sprocket 17, moves chain 18, over sprocket 26, on shaft 44, returning over the rollers 42, on the lower side of the unit. Shaft 34, also turns sprocket 16, and by means of chain 20, rotates sprocket 21, which in turn rotates sprocket 23, on shaft 22, moving chain 24, over sprocket 25. As the chain 24 is moved over sprockets 23 and 25, it carries with it link 33, fastened at 45, to chain 24. This link 33, mounted on shaft 48, in the center of the carriage 32, brings the entire carriage 32, forward and backward as the point 45 travels over sprockets 23 and 25. As the carriage 32 takes the movement either forward or backward, the sprockets 28 and 29 engage chain 18, thereby causing same to rotate, and cause the cleated belt over the roller 31, to move in a forward direction at all times.

Having thus described my invention, what I claim and desire to secure by Letters Patent of the United States, is:

1. In hay loading apparatus, a spreader for distributing the hay over the load comprising a conveyer, means for actuating said conveyer, means for supporting said conveyer, a link pivoted to said conveyer support, an endless member to which said link is pivoted, and means for actuating said endless member, whereby said conveyer is reciprocated over the load to discharge and spread the hay.

2. In hay loading apparatus, a spreader for distributing the hay over the load comprising a conveyer, means for actuating said conveyer, interconnected rollers for mounting said conveyer, a track for said rollers positioned over the load and means connected to one of said rollers for moving said rollers along said track to reciprocate the conveyer over the load whereby the hay is carried over said load and discharged and spread thereon.

ALBERT A. MARKS.